US007889959B2

(12) United States Patent
Pellen

(10) Patent No.: US 7,889,959 B2
(45) Date of Patent: Feb. 15, 2011

(54) COMPOSITE MATERIAL FOR CABLE FLOATATION JACKET

(75) Inventor: Alain T. Pellen, Boca Raton, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/027,457

(22) Filed: Feb. 7, 2008

(65) Prior Publication Data

US 2009/0202210 A1 Aug. 13, 2009

(51) Int. Cl.
*G02B 6/44* (2006.01)

(52) U.S. Cl. ...................................... 385/102; 523/218

(58) Field of Classification Search ................. 385/100, 385/102, 107

See application file for complete search history.

(56) References Cited

U.S. PATENT DOCUMENTS 4,031,059 A * 6/1977 Strauss ....................... 523/179
4,110,274 A * 8/1978 Corbett et al. .............. 521/157
4,178,406 A * 12/1979 Russell ....................... 442/391
4,201,823 A * 5/1980 Russell ....................... 428/194
4,252,378 A * 2/1981 DeBolt et al. .......... 301/64.702
4,305,796 A * 12/1981 Gagliani et al. ............. 521/185
4,439,381 A * 3/1984 Gagliani et al. ............. 264/420
4,595,623 A * 6/1986 Du Pont et al. .......... 428/195.1
4,624,865 A * 11/1986 Gindrup et al. .......... 427/126.2
4,650,626 A * 3/1987 Kurokawa ................... 264/278
4,681,718 A * 7/1987 Oldham ...................... 264/102
4,837,251 A * 6/1989 Okey et al. .................. 523/218
4,861,649 A 8/1989 Browne
4,910,715 A * 3/1990 Savit ........................... 367/20
4,964,936 A * 10/1990 Ferro ......................... 156/242
5,039,990 A * 8/1991 Stevens et al. ................ 342/12
5,122,316 A * 6/1992 Saatchi et al. .............. 264/46.4
5,147,695 A * 9/1992 Colley et al. ............... 428/34.1
5,262,592 A * 11/1993 Aldissi ........................ 174/36
5,283,125 A * 2/1994 Shinozaki et al. ........ 428/411.1
5,356,958 A * 10/1994 Matthews ................... 523/219
5,362,543 A * 11/1994 Nickerson .................... 428/76
5,398,840 A * 3/1995 Luhman et al. ............. 220/563

(Continued)

FOREIGN PATENT DOCUMENTS

EP 102899 A * 3/1984

(Continued)

OTHER PUBLICATIONS

"Properties for Carbon Fiber", "http://www.goodfellow.com/csp/active/STATIC/A/Carbon.html", Jun. 27, 2007, p. 1, Publisher: Goodfellow Corporation.

(Continued)

*Primary Examiner*—Charlie Peng
*Assistant Examiner*—Peter Radkowski
(74) *Attorney, Agent, or Firm*—Fogg & Powers LLC

(57) ABSTRACT

A composite material for a cable floatation jacket is provided. The composite material comprises a thermoplastic elastomer matrix, and a plurality of carbon constituents interspersed in the thermoplastic elastomer matrix. The carbon constituents comprise a plurality of carbon fibers, and a plurality of carbon microballoons attached to each of the carbon fibers. The composite material in heated liquid form can be extruded onto a cable core to produce the floatation jacket.

6 Claims, 5 Drawing Sheets

U.S. PATENT DOCUMENTS 5,427,988 A * 6/1995 Sengupta et al. ............ 501/137
5,486,491 A * 1/1996 Sengupta et al. ............ 501/137
5,503,432 A * 4/1996 Goode ........................ 280/819
5,518,796 A * 5/1996 Tsotsis ....................... 428/116
5,606,329 A * 2/1997 Ramotowski et al. ....... 343/709
5,645,219 A 7/1997 Miks et al.
5,759,647 A * 6/1998 Kuroda et al. .............. 428/34.5
5,773,121 A 6/1998 Meteer et al.
5,786,785 A * 7/1998 Gindrup et al. ................ 342/1
5,866,253 A * 2/1999 Philipps et al. ............. 428/374
5,869,164 A * 2/1999 Nickerson et al. ............. 428/76
5,951,959 A * 9/1999 Nishimura ............... 423/447.1
5,985,405 A * 11/1999 Doucette et al. .............. 428/86
6,042,765 A * 3/2000 Sugahara et al. ........... 264/46.1
6,051,175 A * 4/2000 Kurihara et al. .......... 264/210.8
6,059,669 A * 5/2000 Pearce ........................ 473/339
6,068,915 A * 5/2000 Harrison et al. .......... 428/313.5
6,168,736 B1 * 1/2001 Harrison et al. ............. 264/112
6,183,852 B1 * 2/2001 Rorabaugh et al. ....... 428/307.3
6,207,273 B1 * 3/2001 Kurihara et al. ............. 428/364
6,210,607 B1 * 4/2001 Blake et al. ................. 252/511
6,245,434 B1 * 6/2001 Shinozaki et al. ........... 428/472
6,336,467 B1 * 1/2002 Schneider ................... 137/192
6,417,125 B1 * 7/2002 Rorabaugh et al. ......... 501/95.1
6,576,336 B1 * 6/2003 LeGrande ................... 428/327
6,585,718 B2 * 7/2003 Hayzelden et al. .......... 604/523
6,822,029 B1 * 11/2004 Burmeister et al. ......... 524/271
6,822,048 B1 * 11/2004 Burmeister et al. ......... 525/125
6,879,546 B2 * 4/2005 Halvorsen et al. ........... 367/166
6,969,806 B2 * 11/2005 Dupriest .................. 174/117 F
6,982,383 B1 * 1/2006 Spellman et al. .......... 174/74 R
6,992,253 B1 * 1/2006 Spellman et al. .......... 174/74 R
7,025,644 B2 * 4/2006 Geier et al. ................... 441/74
7,282,260 B2 * 10/2007 LeGrande et al. ........... 428/323
7,284,283 B2 * 10/2007 Mack et al. .................. 2/161.6
7,375,890 B2 * 5/2008 Putnam et al. .............. 359/566
7,405,008 B2 * 7/2008 Domine et al. .............. 428/516
2001/0044477 A1 * 11/2001 Soane et al. .................. 521/60
2002/0171578 A1 * 11/2002 Strait et al. .................... 342/1
2003/0008932 A1 * 1/2003 Soane et al. .................. 521/56
2003/0020785 A1 * 1/2003 Andrews ..................... 347/47
2003/0109188 A1 * 6/2003 Hartert et al. ............... 442/135
2003/0215763 A1 * 11/2003 Campbell ................... 431/320
2003/0221861 A1 * 12/2003 Dupriest .................. 174/117 F
2004/0009331 A1 * 1/2004 Phillips et al. .............. 428/158
2004/0017731 A1 * 1/2004 Halvorsen et al. ........... 367/166
2004/0150967 A1 * 8/2004 Danvir et al. ............... 361/767
2005/0004287 A1 * 1/2005 Burmeister et al. ......... 524/271
2005/0260902 A1 * 11/2005 Geier et al. ................... 441/74
2006/0135709 A1 * 6/2006 Hasegawa et al. ........... 525/474
2006/0219400 A1 * 10/2006 Xu et al. ..................... 166/187
2007/0220653 A1 * 9/2007 Mack et al. .................... 2/159
2007/0236796 A1 * 10/2007 Putnam et al. .............. 359/566

FOREIGN PATENT DOCUMENTS

JP 56161439 A * 12/1981
JP 57197997 A * 12/1982
JP 58010308 A * 1/1983

OTHER PUBLICATIONS

Dupont, "Physical Proberties of Hytrel", "Hytrel Thermoplastic Polyester Elastomer Design Information", Sep. 1998, pp. 1-3, Publisher: Dupont, Published in: Switzerland.
Carlisle et al., "Microstructure and Compressive Properties of Carbon Microballoons", Jul. 2006, pp. 3987-3997, vol. 41, No. 13, Publisher: Springer (Abstract Only).

* cited by examiner

COMPOSITE MATERIAL FOR CABLE FLOATATION JACKET

BACKGROUND

Deep submergence equipment, such as remotely operated underwater vehicles (ROVs), is widely used in both civilian and military offshore endeavors. A typical submersible ROV is unoccupied, highly maneuverable, and operated by a person aboard a boat or ship. The ROV is linked to the boat or ship by a buoyant electromechanical cable, also called a tether, which carries electrical power and includes fiber optics for data communications. The cable needs to be neutrally buoyant at depth to allow good mobility and prevent the cable from getting entangled at the bottom of the sea.

The cable for a submersible ROV typically includes a cable floatation jacket. A thermoplastic elastomer with a specific gravity of about 0.88 has been used as a cable floatation jacket material. Because of the relatively high specific gravity of the elastomer, the diameter of the cable is quite large, inhibiting heat transfer and producing a high amount of drag. Another material that has been used for cable flotation jackets is a polyethylene foam. The polyethylene foam, however, is not elastic, absorbs water, and does not sustain large crushing pressures such as in a deep-sea environment. Glass microballoons have also been used in cable floatation jackets, however, the glass is very abrasive and can damage the cable drive system rollers. The glass material also does not improve the thermal conductivity of the cable floatation jacket.

SUMMARY

The present invention is related to a composite material for a cable floatation jacket. The composite material comprises a thermoplastic elastomer matrix, and a plurality of carbon constituents interspersed in the thermoplastic elastomer matrix. The carbon constituents comprise a plurality of carbon fibers, and a plurality of carbon microballoons attached to each of the carbon fibers.

In another aspect of the invention, a method of making a floatation jacket for a tether cable is provided. The method comprises coating a bonding agent on a continuous carbon fiber, and depositing a plurality of carbon microballoons on the bonding agent coated continuous carbon fiber to form a microballoon coated continuous carbon fiber. The method further comprises chopping the microballoon coated continuous carbon fiber into discrete fiber chains, and mixing the fiber chains with a heated liquid thermoplastic elastomer to produce a mixed composite material, which is extruded onto a cable core to produce the floatation jacket.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

The present invention provides a low specific gravity, thermally conductive composite material, which can be used for a deep-sea cable floatation jacket. The composite material allows for a much thinner floatation jacket than conventional cable floatation jackets, and provides improved thermal conductivity. This allows more power to flow through the cable while reducing drag.

The composite material comprises an elastomeric matrix and carbon-based constituents. The elastomeric matrix can be a thermoplastic elastomer, which retains good cable flexibility. The carbon constituents comprise an assembly of carbon fibers and carbon microballoons. The carbon fibers and carbon microballoons can be bonded together and formed into short chains. The carbon fiber/microballoon chains are mixed with the elastomer to form the composite material. This material is then extruded over an electromechanical cable by standard plastic extrusion methods to form a tether cable with a floatation jacket.

The composite material combines the buoyancy benefit of carbon microballoons with the good thermal conductivity of carbon fibers, allowing more power to be carried through the tether cable. The composite material can be employed as a cable floatation jacket for electromechanical cables attached to deep submergence equipment, such as remotely operated underwater vehicles (ROVs), which require neutrally buoyant cables for power and communications. The present tether cable with the floatation jacket is particularly suited for a high voltage power transmission system for a deep submergence ROV. The composite material can also be used as a floatation jacket for subsea power transmission lines, and in water towed arrays.

Further details of the present invention are discussed hereafter with respect to the drawings and examples.

Figure 1:
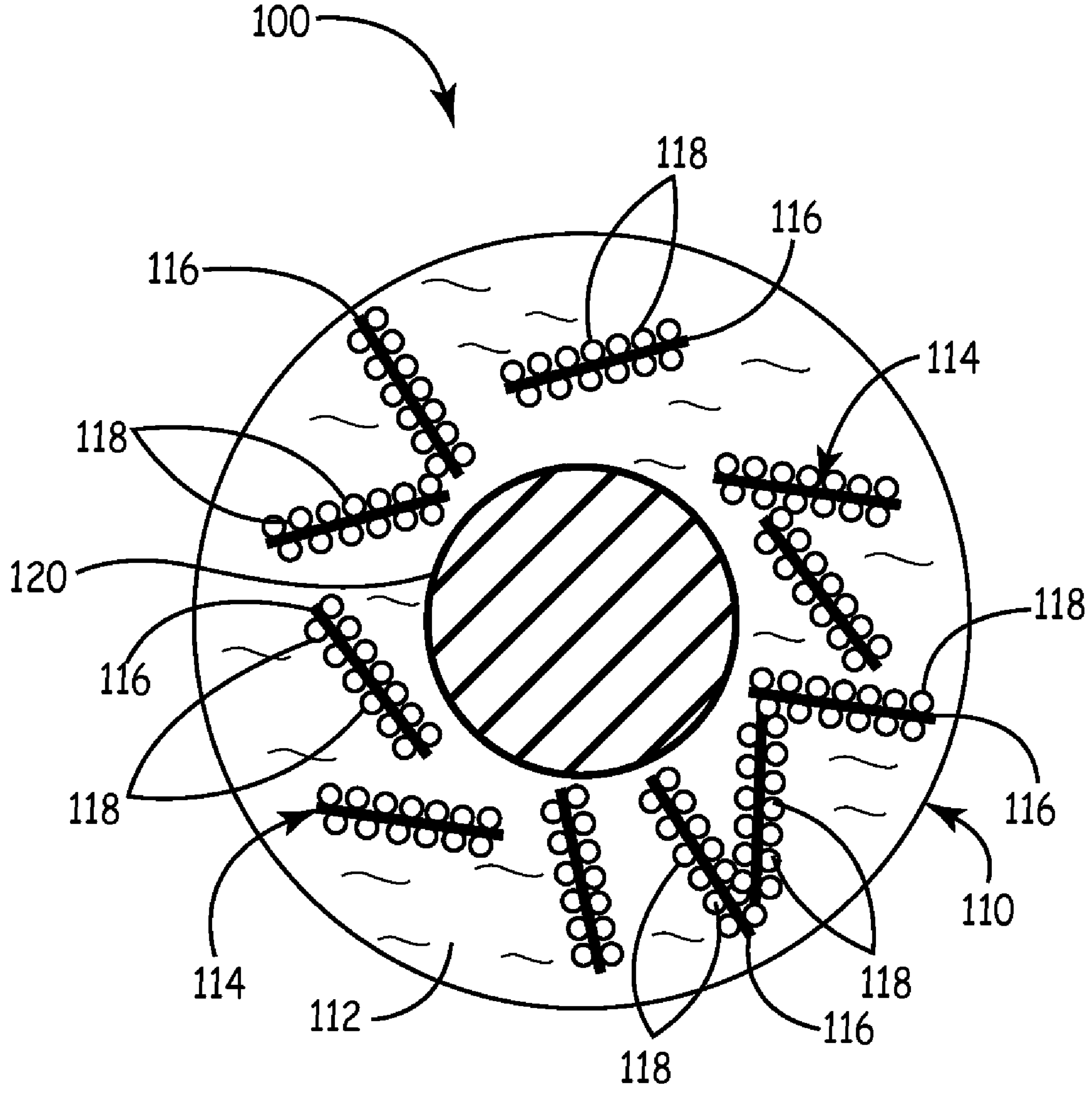
FIG. 1 is a cross-sectional view of a tether cable according to one embodiment.

FIG. 1 is a cross-sectional view of a tether cable 100 having a floatation jacket composite material 110 according to one embodiment. The composite material 110 includes a thermoplastic elastomer matrix 112, and a plurality of carbon constituents 114 interspersed in the thermoplastic elastomer matrix 112. The carbon constituents 114 are composed of a plurality of carbon fibers 116 each having a plurality of carbon microballoons 118 attached thereto. The composite material 110 is formed over an electro-optic cable core 120.

Suitable thermoplastic elastomers for the composite material include copolymers or a physical mix of polymers (e.g., plastic and rubber) which have both thermoplastic and elastomeric properties for retaining good cable flexibility. Examples of suitable thermoplastic elastomers include styrenic block copolymers, polyolefin blends, elastomeric alloys, thermoplastic polyurethanes, thermoplastic polyesters, thermoplastic polyamides, and the like. These thermoplastic elastomers can be used singly in the composite material or in various combinations. In one embodiment, the composite material comprises a thermoplastic polyester with carbon constituents.

The carbon constituents can be short carbon fiber/microballoon chains having a length of about 0.2 inch to about 0.5 inch. The carbon fibers are used in an effective amount to increase the thermal conductivity of the composite material. The carbon fibers can comprise about 0.5 wt-% to about 2.5 wt-% of the composite material. The carbon microballoons (also known as hollow microspheres) are used in an effective amount so that the composite material provides increased floatation to the tether cable. The carbon microballoons can have a specific gravity of about 0.3 or less.

In one embodiment, the composite material has a specific gravity of less than about 0.8. In another embodiment, the composite material has a specific gravity of about 0.5 to about 0.6. The composite material takes advantage of the high thermal conductivity of carbon fibers in combination with the low effective specific gravity of the carbon microballoons to provide added buoyancy, while still being able to sustain crushing deep-sea pressures.

Figure 2:
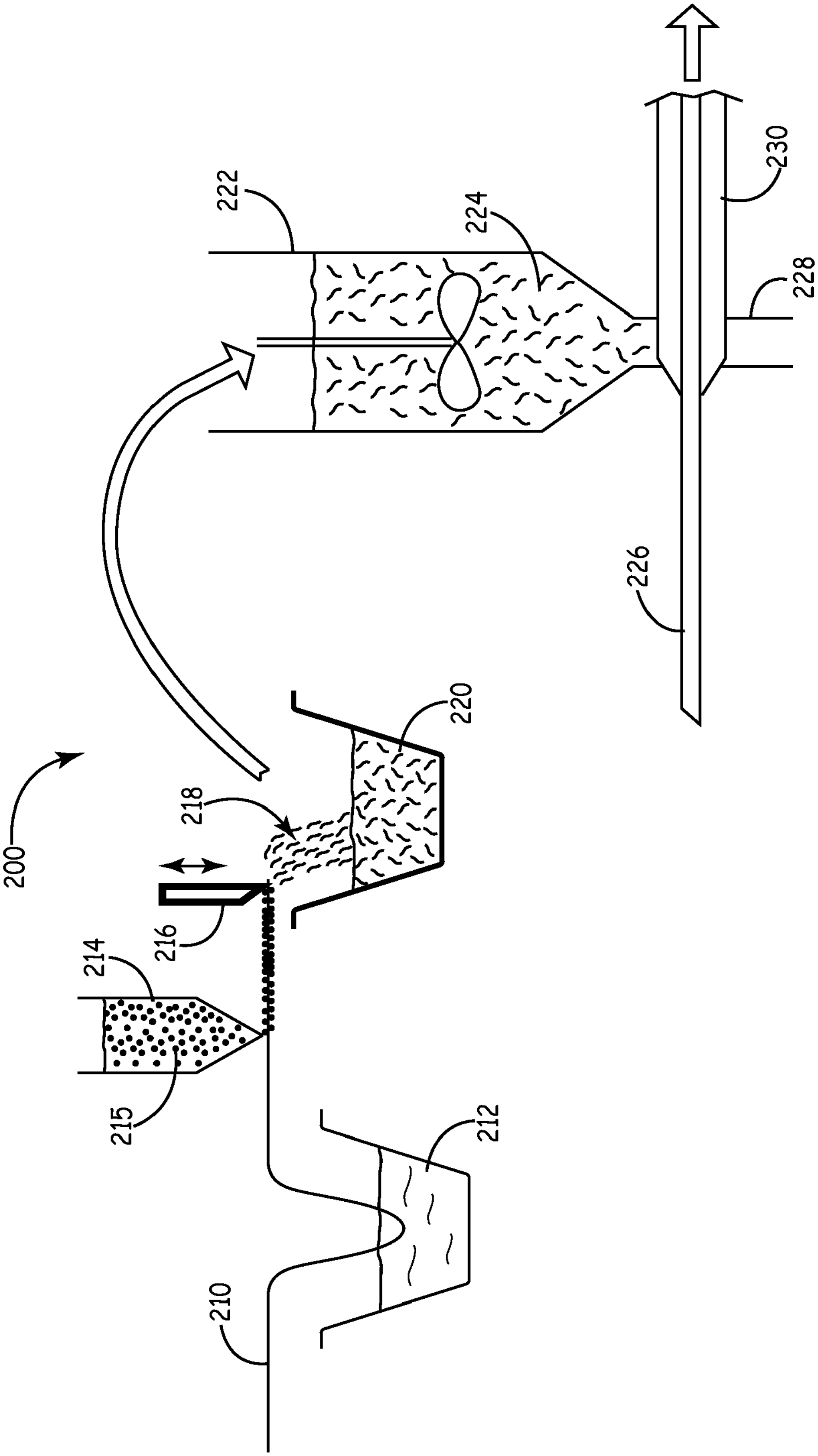
FIG. 2 is a schematic depiction of an apparatus and process for forming a floatation jacket around a cable core according to one embodiment.

FIG. 2 is a schematic depiction of an apparatus and process 200 for forming a floatation jacket for a tether cable using the present composite material. Initially, a continuous carbon fiber 210 is fed through a bonding agent bath 212. The carbon fiber 210 coated with the bonding agent is then passed through a microballoon deposition chamber where a dispenser 214 deposits a plurality of microballoons 215 on the carbon fiber 210. The carbon fiber with microballoons bonded thereto is then cut by a fiber chopper 216 into small discrete fiber chains 218 that are dropped into a bin 220. The fiber chains 218 are then fed to a mixer 222 having a hot liquid elastomer 224 to produce a mixed composite material. A cable core 226 is passed through a cable jacket extruder 228 and covered with the composite material to form a floatation jacket 230 surrounding cable core 226.

Figure 3:
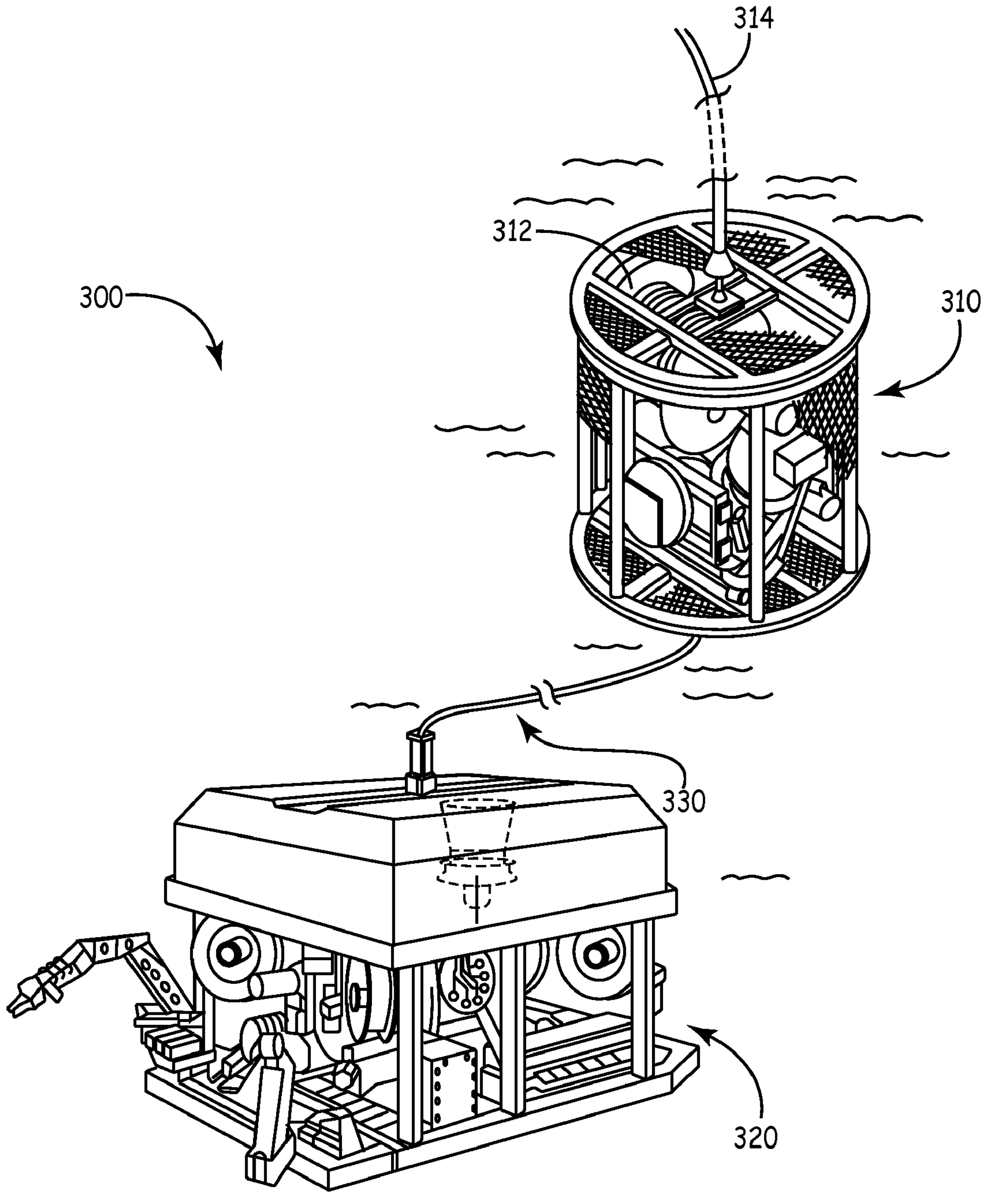
FIG. 3 is a schematic depiction of a deep submergence remotely operated underwater vehicle system that can employ the tether cable of FIG. 1.

FIG. 3 is a schematic depiction of a deep submergence remotely operated underwater vehicle (ROV) system 300 that can employ the present tether cable having the composite floatation jacket. The ROV system 300 generally includes a tether management system (TMS) 310 that is operatively connected to an underwater vehicle 320 by a tether cable 330 that is neutrally buoyant. The TMS 310 includes a storage winch 312 for winding up or letting out tether cable 330 as underwater vehicle 320 travels to or away from TMS 310. The TMS 310 is operatively connected to a support ship (not shown) by an umbilical cable 314. In one embodiment, tether cable 330 can be about 300 feet long.

The present composite material allows for a decrease in the tether cable diameter, which reduces drag and improves the thermal conductivity of the cable floatation jacket, thereby allowing more power carrying capability. The decreased diameter of the tether cable also allows for a longer tether cable on the storage winch, which improves the operational footprint and responsiveness of an ROV.

The following examples are given to illustrate the present invention, and are not intended to limit the scope of the invention.

Example 1

An assessment was made to determine how heavy the carbon fiber and microballoon loading needs to be to get a usable thermal conductivity increase for a floatation jacket composite material. The carbon fiber constituent is the main contributor to the increased thermal conductivity of the composite material. The purpose of the microballoon constituent is mainly to gain buoyancy, since the carbon fibers by themselves are heavier than the jacket material matrix. The microballoons also improve the material thermal conductivity, but not extensively.

Figure 4:
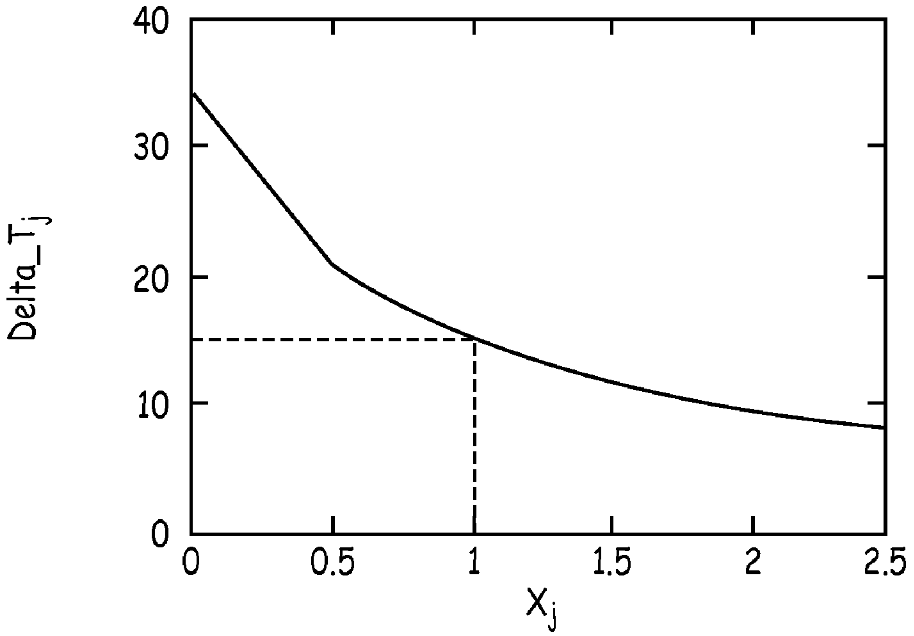
FIG. 4 is a graph that plots the temperature drop across a floatation jacket composite material as a function of carbon fiber loading.

The composite materials used in the assessment included a thermoplastic rubber (TPR) with a specific gravity (SG) of 0.8. Any formulated material with a lower SG than 0.8 is an improvement. The graph of FIG. 4 plots the temperature drop in ° C. (Delta_$T_j$) across the composite material as a function of the percent carbon fiber loading ($X_j$). As the graph of FIG. 4 shows, the temperature rise across the composite material is significantly reduced with only 1% fiber content. Adding more carbon fiber does not make as much of an impact.

Figure 5:
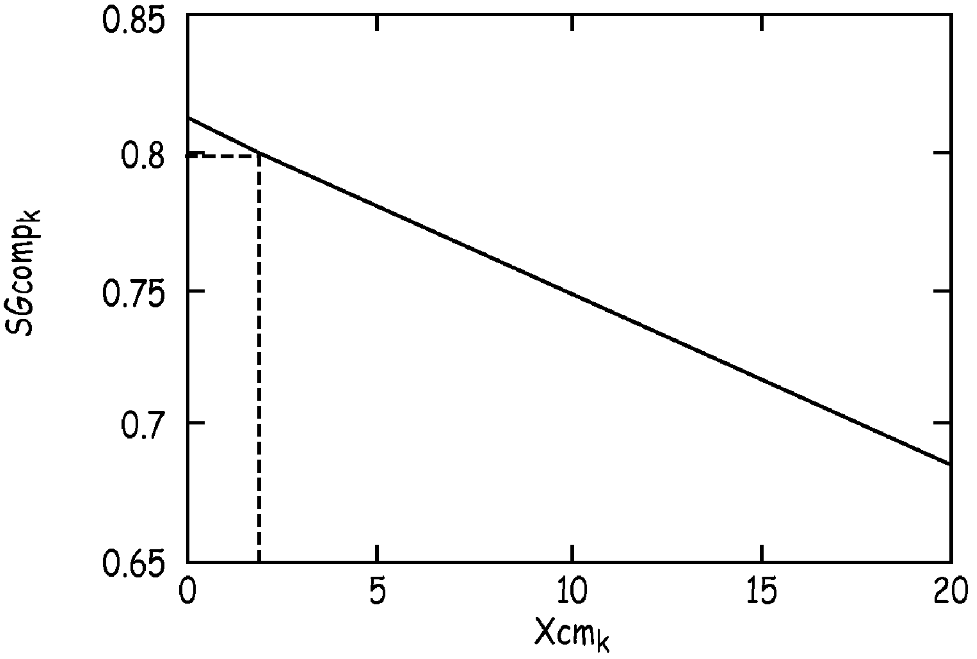
FIG. 5 is a graph that plots the change in specific gravity of a floatation jacket composite material as a function of carbon microballoon loading.

The graph of FIG. 5 plots the change in specific gravity of the composite material ($SGcomp_k$) as a function of carbon microballoon loading ($Xcm_k$), using a TPR material matrix loaded with 1% carbon fiber. As shown in the graph of FIG. 5, the 0.8 specific gravity threshold is the specific gravity of the TPR material used. Therefore, the composite material only needs about 2% microballoon content to have a beneficial decrease in specific gravity. As the microballoon content increases, the specific gravity of the composite material is further reduced.

Example 2

A floatation jacket composite material was made of a thermoplastic elastomer (TPR) matrix, with carbon fiber and carbon microballoon elements. The composite material had the following constituent properties:

Thermoplastic Elastomer:
Density: 0.8 g/cm$^3$
Thermal conductivity: 0.15 Watt/m-° C.
Flexural modulus: 40,000 to 300,000 psi
Carbon Fibers:
Density: 1.74 to 1.95 g/cm$^3$
Thermal conductivity: 17 Watt/m·K
Carbon Microballoons:
Density: 0.143 to 0.177 g/cm$^3$ The effect of the carbon content on the temperature gradient through the composite material was determined. The following calculations were used to compute the change in thermal resistance as a function of the carbon content:

$$j=0 \ldots 5$$

$$X_j=0.5 \cdot j$$

This is the percent of carbon content in the composite material.

$X_j =$

| |
|---|
| 0 |
| 0.5 |
| 1 |
| 1.5 |
| 2 |
| 2.5 |

$K_{tpr}$=0.13 Watt/m-° C. (thermal conductivity of TPR).

$K_{cf}$=17 Watt/m-C (thermal conductivity of carbon fiber).

The resulting thermal conductivity of the composite material was calculated as:

$$Kcomp_j = \frac{\lfloor 100 - (X_j) \rfloor}{100}(K_{tpr}) + \frac{(X_j)}{100}(K_{cf})$$

Length=1 m (1 meter unit length of cable).

$Q_{length}$=35 W (Watts internal heat generated per unit length of cable)

$Kcomp_j =$

| |
|---|
| 0.13 |
| 0.214 |
| 0.299 |
| 0.383 |
| 0.467 |
| 0.552 |

Din=0.0213 m (21.3 mm inner diameter of the cable jacket).

Dout=0.047 m (47 mm outer diameter of the cable jacket).

$$\text{Delta\_T}_j = \frac{Qlength}{2 \cdot \pi \cdot (Kcomp_j) \cdot \text{Length}} \cdot \ln\left(\frac{Dout}{Din}\right)$$

The foregoing equations and parameters were used to compute the change in temperature gradient through the cable jacket composite material as a function of the carbon content.

Percent of carbon ° C. temperature rise of cable as a content function of the carbon content

| $X_j =$ | $\text{Delta\_T}_j =$ |
|---|---|
| 0 | 33.913 |
| 0.5 | 20.568 |
| 1 | 14.759 |
| 1.5 | 11.509 |
| 2 | 9.432 |
| 2.5 | 7.99 |

These values for the change in temperature gradient as a function of the carbon content are plotted in the graph of FIG. 4.

Example 3

A floatation jacket composite material was made of a thermoplastic elastomer matrix, with carbon fiber and carbon microballoon elements. The composite material had the following constituent properties:

Thermoplastic Elastomer:

Density: 0.8 g/cm$^3$

Thermal conductivity: 0.15 Watt/m-° C.

Flexural modulus: 178,000 psi (40,000 to 300,000 psi range)

Carbon Fibers:

Density: 1.74 to 1.95 g/cm$^3$

Thermal conductivity: 17 W/m·K (May be as high as 1000 W/m·K depending on the type of carbon fiber)

Flexural modulus: 17,800,000 psi

Carbon Microballoons:

Density: 0.143 to 0.177 g/cm$^3$

The effect of the carbon fiber on the composite material flexural modulus (stiffness) was determined. The following calculations were used to compute the change in flexural modulus as a function of the carbon fiber content:

j=0 . . . 5

$Xcf_j = 0.5 \cdot j$

This is the percent of carbon fiber content in the TPR matrix.

$Flexmod_{tpr}$=170,000 psi (flexural modulus of TPR).

$Flexmod_{cf}$=17,800,000 psi (flexural modulus of carbon fiber).

The resulting flexural modulus of the composite material was calculated as:

$$Flexmodcomposite_j = \frac{\lfloor 100 - (Xcf_j) \rfloor}{100} \cdot Flexmod_{tpr} + \frac{(Xcf_j)}{100} \cdot Flexmod_{cf}$$

Figure 6:
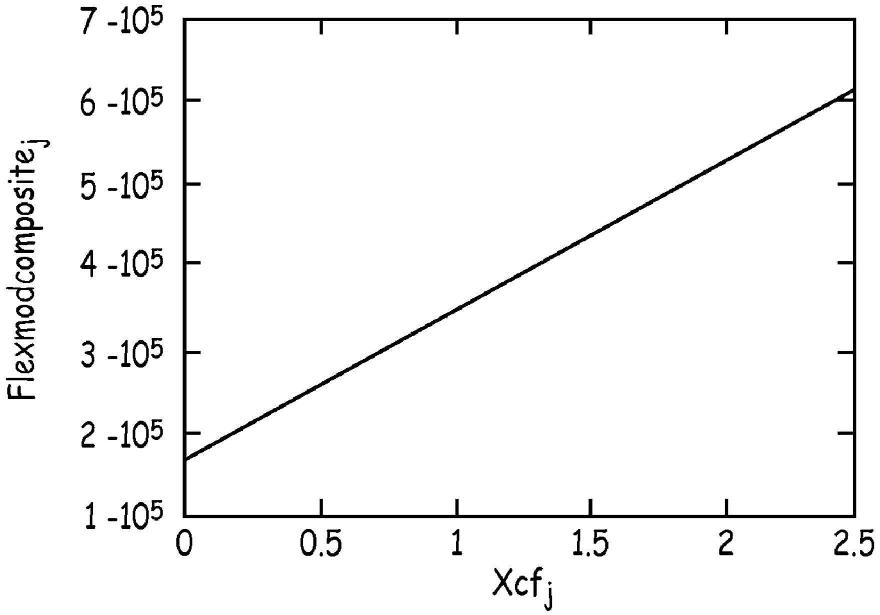
FIG. 6 is a graph that plots the change in flexural modulus of a floatation jacket composite material as a function of carbon fiber loading.

The graph of FIG. 6 plots the change in the composite material flexural modulus ($Flexmodcomposite_j$) as a function of percent carbon fiber content ($Xcf_j$). As shown in the graph, as the fiber loading is increased, the composite material flexural modulus also is increased.

Example 4

A floatation jacket composite material was made of a thermoplastic elastomer matrix, with carbon fiber and carbon microballoon elements. The composite material had the following constituent properties:

Thermoplastic Elastomer:

Density: 0.8 g/cm$^3$

Thermal conductivity: 0.15 Watt/m-° C.

Carbon Fibers:

Density: 1.74 to 1.95 g/cm$^3$

Thermal conductivity: 17 W/m·K (May be as high as 1000 W/m·K depending on the type carbon fiber)

Carbon Microballoons:

Density: 0.143 to 0.177 g/cm$^3$

The effect of 2.5% carbon fiber content on the composite material specific gravity was determined. The following parameters were used to compute the composite material specific gravity ($SGcomp_k$) as a function of the percent carbon microballoon content ($Xcm_k$):

j=5 k=0 . . . 40

$Xcf_j$=0.5·j This is the percent of carbon fiber content in the TPR matrix $Xcm_k$=0.5·k This is the percent of carbon microballoon content in the TPR matrix $SG_{tpr}$=0.8 g/cm$^3$ (specific gravity of TPR)

$SG_{cf}$=1.8 g/cm$^3$ (specific gravity of carbon fiber)

$SG_{cm}$=0.177 g/cm$^3$ (specific gravity of carbon microballoons)

The resulting specific gravity of the composite material was calculated using the following equation:

$$SGcomp_k = \frac{\lfloor 100 - (Xcf_j) - (Xcm_k) \rfloor}{100} \cdot SG_{tpr} + \frac{(Xcf_j)}{100} SG_{cf} + \frac{(Xcm_k)}{100} SG_{cm}$$

Figure 7:
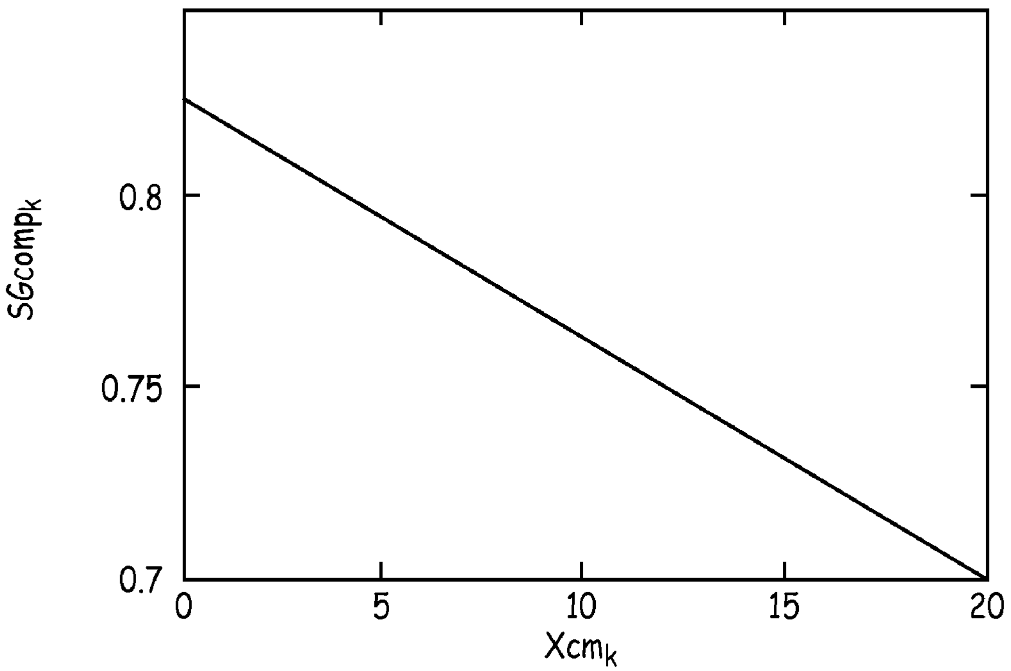
FIG. 7 is a graph that plots the change in specific gravity of a floatation jacket composite material as a function of carbon microballoon loading.

The graph of FIG. 7 plots the resulting composite material specific gravity as a function of the percent carbon microballoon content in the TPR material matrix loaded with 2.5% carbon fiber. As shown in the graph, as the microballoon content increases, the specific gravity of the composite material is reduced.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method of making a floatation jacket for a tether cable, the method comprising:

coating a bonding agent on a continuous carbon fiber;

depositing a plurality of carbon microballoons on the bonding agent coated continuous carbon fiber to form a microballoon coated continuous carbon fiber, wherein the bonding agent is cured to form a solid bond between the continuous carbon fiber and the carbon micro-balloons;

chopping the cured microballoon coated continuous carbon fiber into discrete fiber chains;

mixing the fiber chains with a heated liquid thermoplastic elastomer to produce a mixed composite material; and extruding the mixed composite material onto a cable core to produce the floatation jacket.

2. The method of claim 1, wherein the coated continuous carbon fiber is passed through a microballoon deposition chamber where a dispenser deposits the plurality of carbon microballoons on the coated continuous carbon fiber.

3. The method of claim 2, wherein the carbon microballoons are sprayed over the coated continuous carbon fiber.

4. The method of claim 3, wherein the carbon micro-balloons are coated with a bonding agent and then sprayed over the continuous carbon fiber.

5. The method of claim 3, wherein the continuous carbon fiber is fed through a bonding agent bath prior to the carbon microballoons being sprayed over the coated continuous carbon fiber.

6. The method of claim 1, wherein the composite material has a thermal conductivity of about 0.5 Watt/m-° K or higher to efficiently dissipate heat generated by resistive power losses inside the cable core.

* * * * *